United States Patent [19]
Ogino

[11] Patent Number: 5,646,915
[45] Date of Patent: Jul. 8, 1997

[54] INFORMATION RECORDING/ REPRODUCING APPARATUS IN WHICH A CONTROL VALUE FOR CONTROLLING A RECORDING/REPRODUCING HEAD IS GENERATED ON THE BASIS OF A CORRECTED CURRENT MOVING VELOCITY AND A TARGET MOVING VELOCITY

[75] Inventor: Tsukasa Ogino, Kawasaki, Japan

[73] Assignee: Canon Kabushiki Kaisha, Tokyo, Japan

[21] Appl. No.: 350,155

[22] Filed: Nov. 29, 1994

Related U.S. Application Data

[63] Continuation of Ser. No. 886,849, May 22, 1992, abandoned.

[30] Foreign Application Priority Data

May 29, 1991 [JP] Japan .................... 3-152247

[51] Int. Cl.⁶ .................................................. G11B 7/00
[52] U.S. Cl. ............................................ 369/32; 369/44.28
[58] Field of Search .................. 369/44.11, 44.25–44.29, 369/32, 54, 48, 58; 360/78.06, 78.08, 78.09

[56] References Cited

U.S. PATENT DOCUMENTS

| | | | |
|---|---|---|---|
| 4,524,398 | 6/1985 | Fujiki | 360/78.04 |
| 4,677,507 | 6/1987 | Elliott | 360/78.04 |
| 4,866,687 | 9/1989 | Kasai et al. | 369/44.28 |
| 4,920,462 | 4/1990 | Couse et al. | 360/78.04 |
| 5,046,058 | 9/1991 | Shimonou | 369/44.28 |
| 5,182,736 | 1/1993 | Yanagi | 369/58 |
| 5,258,966 | 11/1993 | Yanagi | 369/44.28 |
| 5,285,431 | 2/1994 | Ogawa | 369/44.28 |
| 5,329,509 | 7/1994 | Takahara et al. | 369/32 |
| 5,398,221 | 3/1995 | Ogawa | 369/32 |

FOREIGN PATENT DOCUMENTS

| | | |
|---|---|---|
| 0409574 | 1/1991 | European Pat. Off. |
| WO8908917 | 9/1989 | WIPO |

*Primary Examiner*—Nabil Hindi
*Attorney, Agent, or Firm*—Fitzpatrick, Cella, Harper & Scinto

[57] ABSTRACT

An information recording and/or reproducing apparatus includes a head for effecting information recording on and/or information reproduction from a recording medium. The head is moved to a desired track on the recording medium by a driving device. A tracking error signal of the head, generated when the head is moved by the driving device is detected. At every predetermined period of the tracking error signal, the head drive velocity is calculated from a distance corresponding to the predetermined period and a time corresponding to the predetermined period. The calculated velocity is corrected on the basis of an acceleration of the head and a time period during which the acceleration is applied, so that the driving device is controlled by use of the corrected drive velocity.

7 Claims, 5 Drawing Sheets

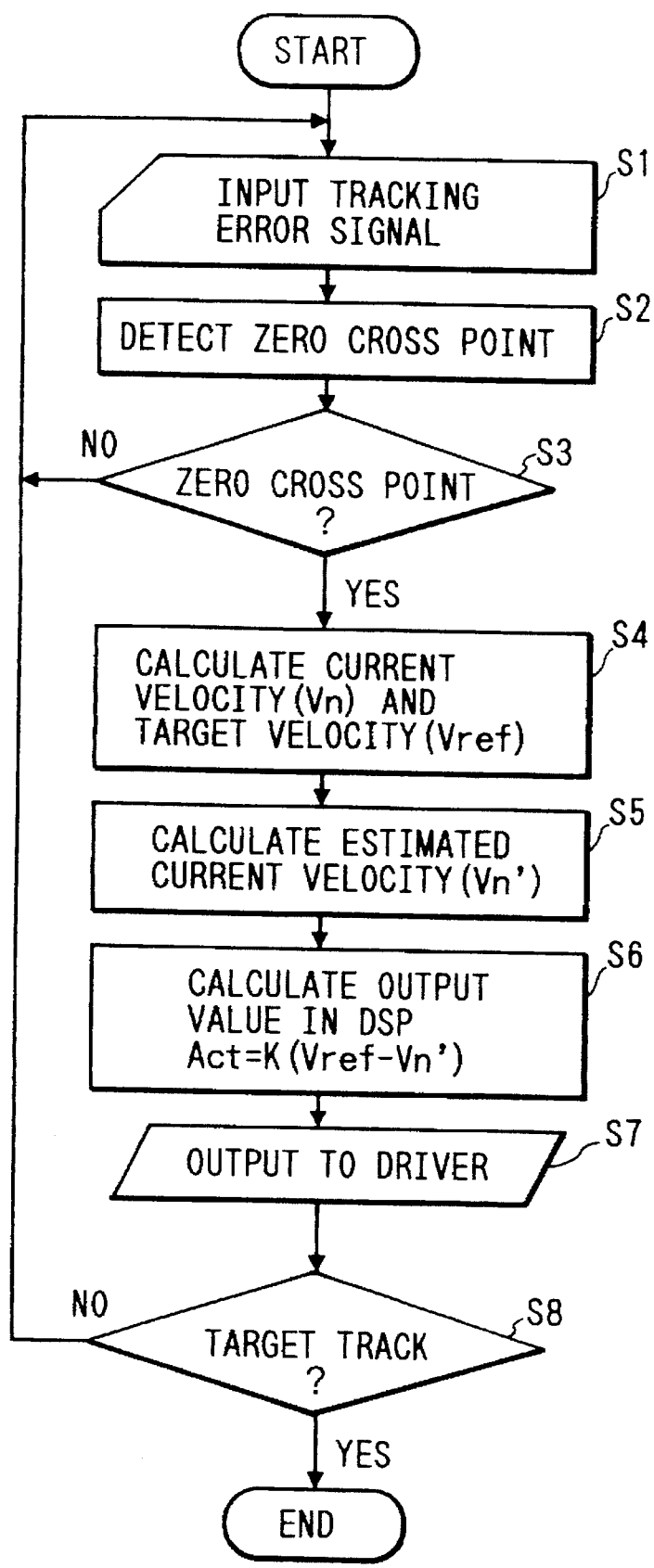

INFORMATION RECORDING/ REPRODUCING APPARATUS IN WHICH A CONTROL VALUE FOR CONTROLLING A RECORDING/REPRODUCING HEAD IS GENERATED ON THE BASIS OF A CORRECTED CURRENT MOVING VELOCITY AND A TARGET MOVING VELOCITY

This application is a continuation of prior application, Ser. No. 07/886,849 filed May 22, 1992, now abandoned.

BACKGROUND OF THE INVENTION

1. Field of the Invention

The present invention relates to an information recording/ reproducing apparatus for recording and/or reproducing information on and/or from an information recording medium such as a magnetic disk or a magneto-optical disk, and more particularly to a velocity control unit for a head in a seek mode which is used to record and/or reproduce information.

2. Related Background Art

When an information recording/reproducing head is to be driven to a desired position (track) on an information recording medium, velocity of the head is controlled. In a prior art velocity control system, the velocity of the head is sequentially monitored so that the head seeks in accordance with a predetermined drive scheme. FIG. 1 shows relationships among a reference velocity, an actual velocity and current supplied to a head drive actuator. The reference velocity $V_{ref}$ represents a drive schedule velocity of the head and it is calculated in accordance with a remaining distance to a target point. The reference velocity $V_{ref}$ is given by:

$$V_{ref}=[2\cdot\alpha(S-\lambda/2\cdot N)]^{1/2} \quad (1)$$

where S is the target moving distance, $\alpha$ is a deceleration amount and N is a zero-crossing count. The actual velocity of the head is sequentially detected so that the head velocity follows the reference velocity. For example, zero-crossing points of a tracking error signal are detected to count a time period $\Delta t_n$ between a zero-crossing point and the next zero-crossing point, and a current velocity $V_n$ of the head is calculated based on the time $\Delta t_n$ and a track pitch $\lambda$. It is represented by a formula as follows. A distance between the zero-crossing points corresponds to $\frac{1}{2}$ of the track pitch $\lambda$.

$$V_n = \lambda/2 \times 1/\Delta t_n \quad (2)$$

When the head velocity is to be controlled, a command value for an actuator is calculated at every predetermined period based on the current velocity and the target velocity, and the head velocity is controlled based on the calculated command value. The command value $A_{ct}$ is calculated as follows:

$$A_{ct}=K(V_{ref}-V_n) \quad (3)$$

where K is a feedback gain of a velocity control system. In this manner, in the prior art, the head velocity is sequentially detected and the command value calculated based on the detected head velocity and the target velocity is fed back at every predetermined period so that the head is driven to follow the target velocity as shown in FIG. 1 and the head is seek controlled to the target position in accordance with a predetermined drive schedule.

However, the prior art velocity control system has a problem in that the detected current head velocity does not always match a real velocity, but it is delayed from the actual velocity. The delay of the detected velocity is now described in detail with reference to FIGS. 2A and 2B. FIG. 2A shows a head reference velocity (target velocity), a real velocity and a detected current velocity, and FIG. 2B shows a tracking error signal. When the head velocity is to be detected, it is calculated based on the distance between the zero-crossing points and the time to move thereacross so that the calculated velocity is an average velocity between the zero-crossing points. As shown in FIGS. 2A and 2B, the velocity calculated at each detection of the zero-crossing point is an average between the zero-crossing points as shown by a stepwise velocity curve. At the time of detection of the zero-crossing point at which the velocity is actually calculated, a delayed velocity from a real velocity is calculated as a current velocity. This trend is remarkable in a low velocity area where the time required to pass the distance between the zero-crossing points is long. As a result, in the prior art, the velocity control is unstable and exact seeking operation of the head is difficult to attain.

SUMMARY OF THE INVENTION

In light of the above, it is an object of the present invention to provide an information recording and/or reproducing apparatus which can exactly control the seek operation of a head by effectively correcting a delay of a detected head velocity relative to a real velocity.

The above object of the present invention is achieved by an information recording/reproducing apparatus comprising: a head for recording and/or reproducing information to and/or from a recording medium; drive means for moving said head to a desired track on the recording medium; means for detecting a tracking error signal of said head, generated when said head is driven by said drive means; and means for calculating a drive velocity of said head at every predetermined period of the tracking error signal based on a distance corresponding to said period and a time period of said period, correcting the calculated velocity based on an acceleration of said head and a time period during which the acceleration is applied, and controlling said drive means based on the corrected velocity.

BRIEF DESCRIPTION OF THE DRAWINGS

FIG. 5 shows a flow chart of a seek control operation in the embodiment of FIG. 3.

DETAILED DESCRIPTION OF THE PREFERRED EMBODIMENTS

Figure 1:
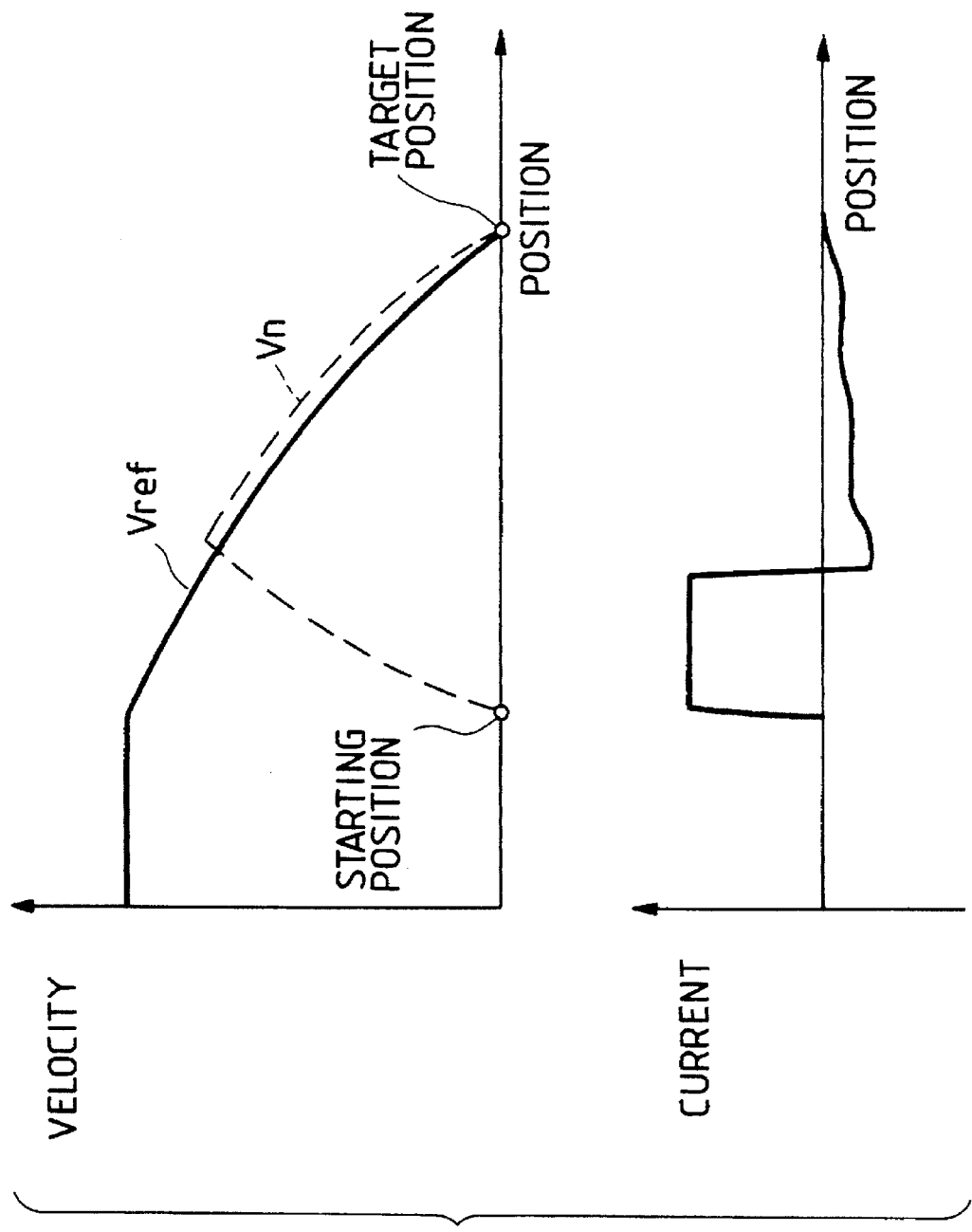
FIG. 1 shows a relationship among a reference velocity, a real velocity and current applied to an actuator in a prior art velocity control system for a recording/reproducing head.
Figure 2A:
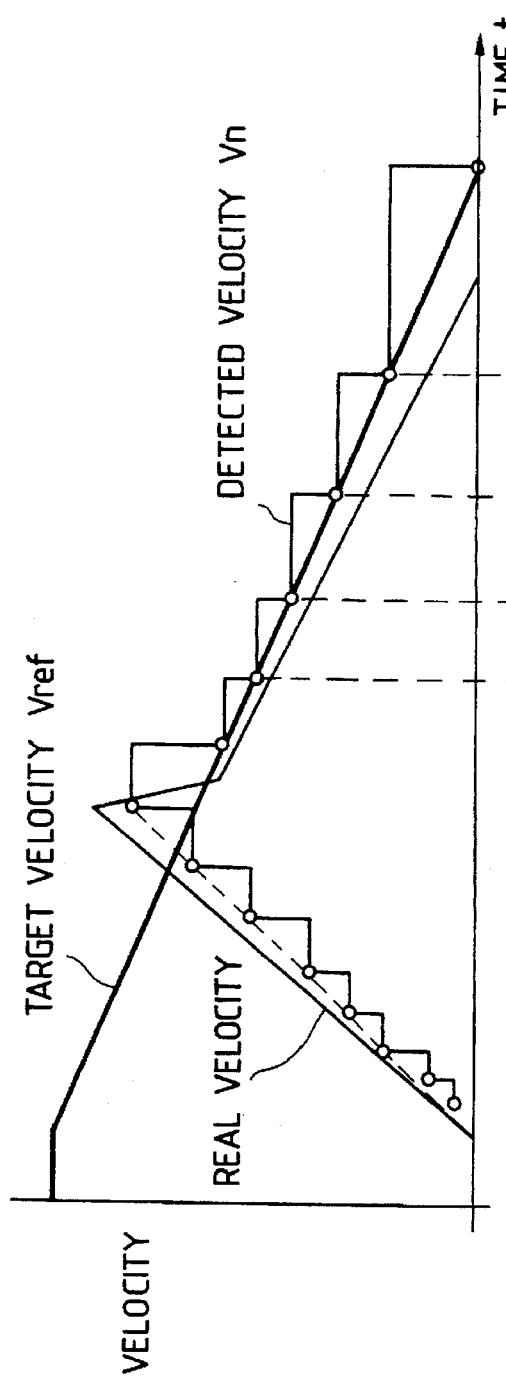
FIGS. 2A and 2B show a relationship among a target velocity of the head, a detected velocity, a real velocity and a tracking error signal.
Figure 2B:
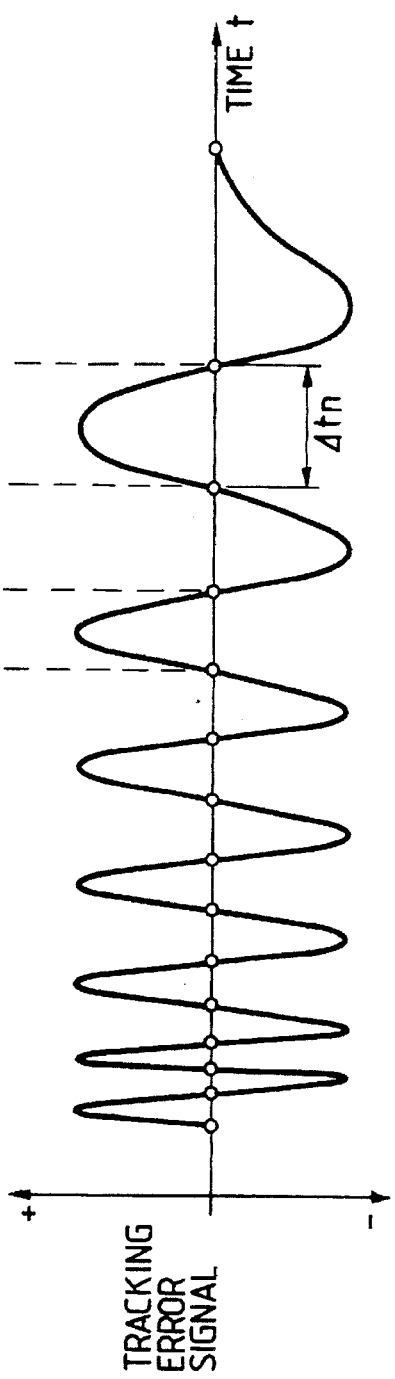
Figure 3:
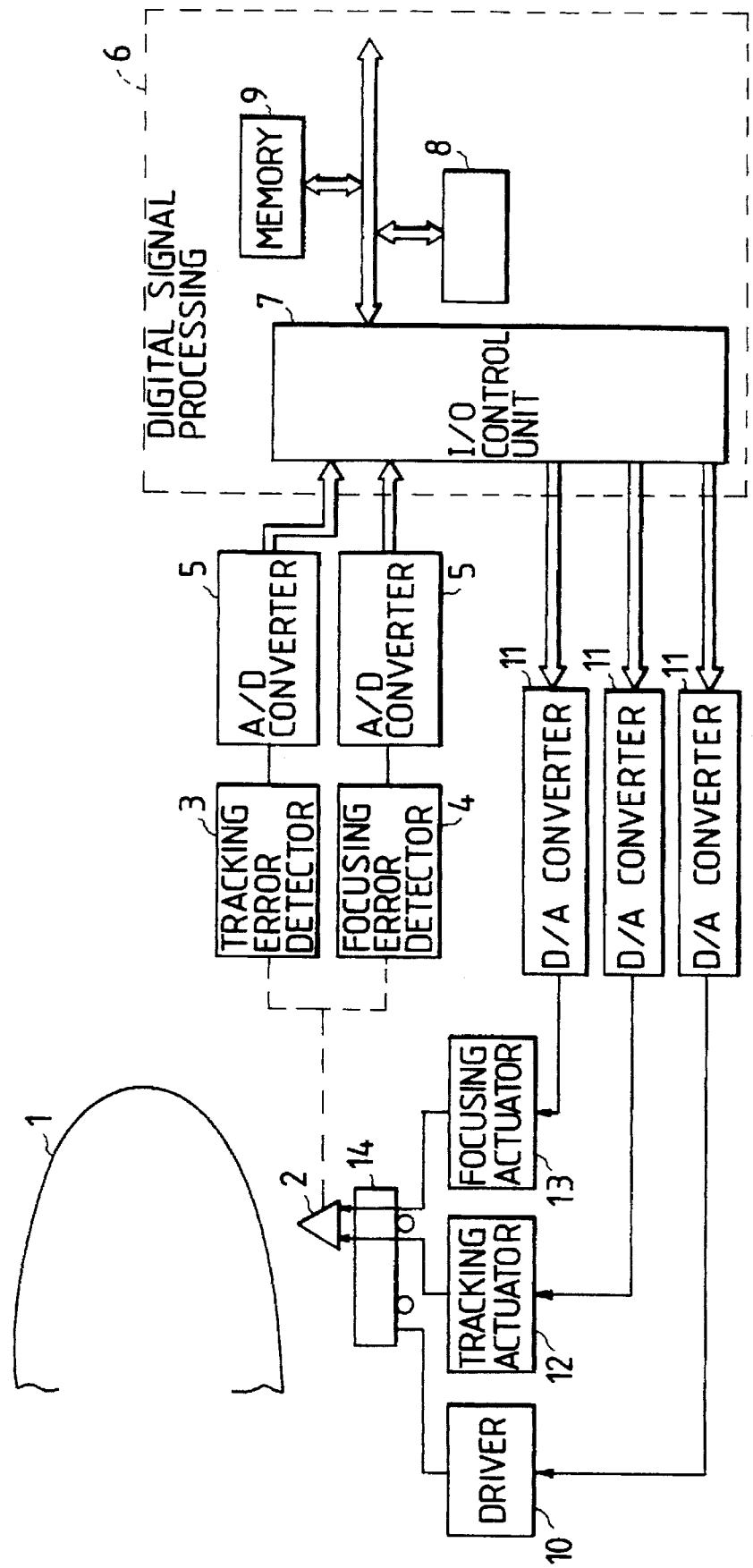
FIG. 3 shows a block diagram of one embodiment of an information recording/reproducing apparatus of the present invention.

One embodiment of the present invention is now explained in detail with reference to the drawings. FIG. 3 shows a block diagram of one embodiment of the information recording/reproducing apparatus of the present invention. In FIG. 3 an optical disk apparatus is shown, as an example.

In FIG. 3, numeral 1 denotes an optical disk which is an information recording medium and it is rotated at a constant speed by a drive system (not shown). Numeral 2 denotes an optical system for optically recording information on the optical disk 1 or reproducing the recorded information from the optical disk 1. The optical system 2 comprises a semiconductor laser which is a light source for recording and reproducing information, various optical elements for optically processing the light beam and a sensor for detecting a reflected light from the optical disk. Numeral 12 denotes a tracking actuator which drives a focusing objective lens (not shown) arranged in the optical system 2 in a tracking direction, and numeral 13 denotes a focusing actuator for driving the objective lens in a focusing direction. The optical system 2 and the two actuators are assembled in the optical head so as to be movable in the radial direction of the optical disk 1. Numeral 14 denotes a linear motor for driving the optical head radially with respect to the optical disk 1 and numeral 10 denotes a driver for the linear motor 14.

Numeral 3 denotes a tracking error detector for detecting a tracking error signal based on an output of a sensor in the optical system 2 and numeral 4 denotes a focus error detector fordetecting a focus error signal based on the output of the sensor. The error signals detected by those detectors are converted to digital signals by an A/D converter 5 and supplied to a digital signal processor 6, which is a main control unit of the optical disk apparatus of the present embodiment and which carries out the velocity control of the optical head. The velocity control of the optical head will be discussed in detail later. The digital signal processor 6 comprises an I/O control unit 7 for controlling the input/output of a signal, a DSP (digital signal processor) 8 for executing arithmetic and logic operations necessary for the control in accordance with a predetermined control program and a memory 9 for storing various data. The DSP 8 calculates command values for the tracking actuator 12, the focus actuator 13 and the linear motor 14, and they are converted to analog signals by a D/A converter 11 to be supplied to the respective element.

Figure 4:
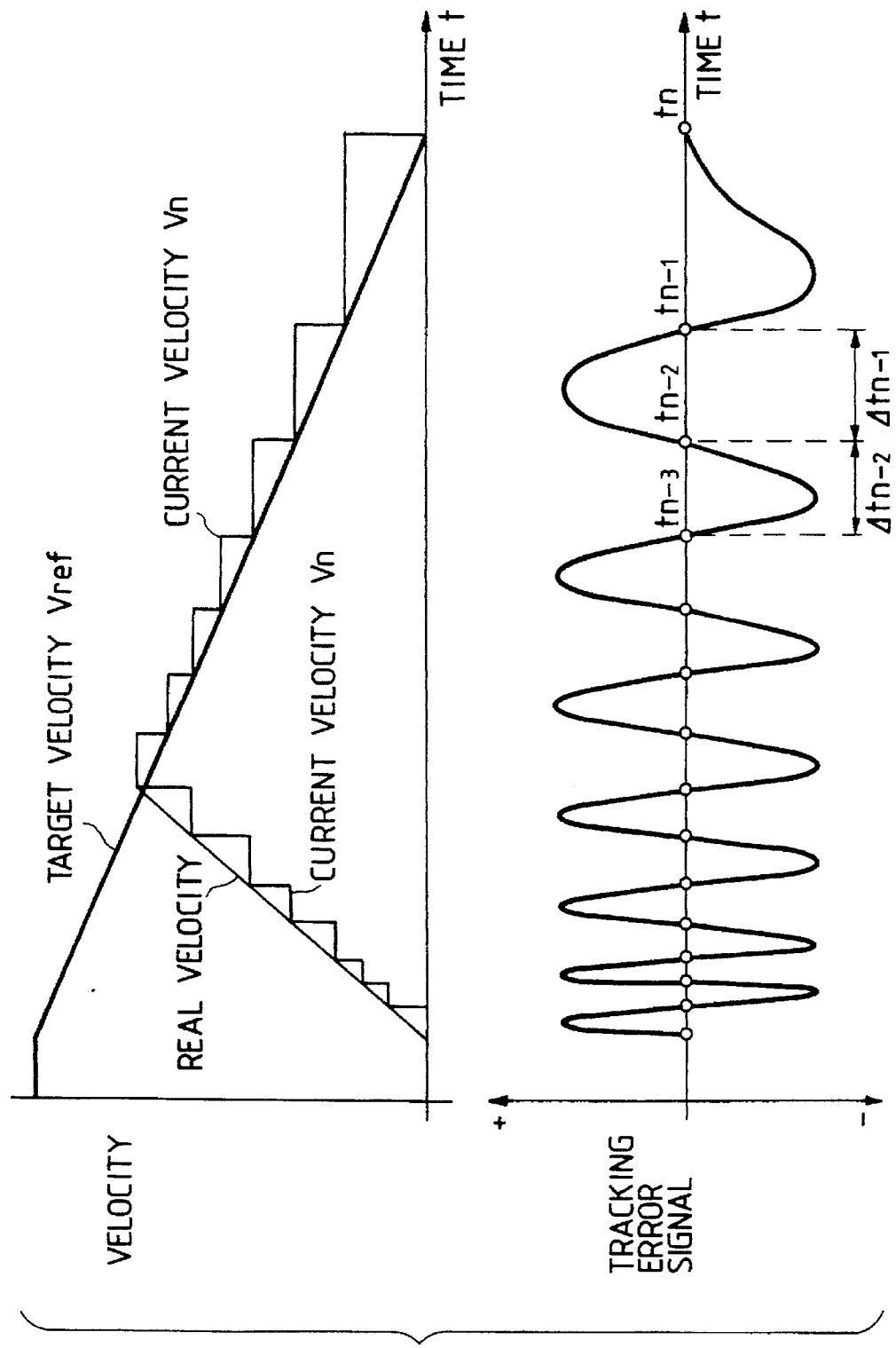
FIG. 4 shows a time chart of a relationship among a target velocity of an optical head, a detected current velocity, a real velocity and a tracking error signal in a third embodiment of the present invention.

A velocity control operation of the present embodiment is now explained. Velocity detection of the optical head is first explained. FIG. 4 shows a time chart of a relationship among a target velocity of the optical head, a real velocity, a detected current velocity and a tracking error signal upon a seeking operation. In the present example, seven tracks are sought and one period of the tracking error signal corresponds to one track. In the present embodiment, a target velocity and a velocity of the optical head at a point $t_{n-2}$ in FIG. 4 are determined in the following manner. Zero-crossing points of the tracking error signal are detected and counted. A time $\Delta t_{n-2}$ from one zero-crossing point to the next zero-crossing point is counted and a distance between the zero-crossing points is ½ of the track pitch $\lambda$. A target velocity $V_{ref(n-1)}$ is calculated based on the zero-crossing count $N_{n-2}$. The target velocity is calculated by the formula (1) described above.

$$V_{ref(n-2)} = [2 \cdot \alpha (S - \lambda/2 \cdot N_{n-2})]^{1/2} \qquad (4)$$

where S is a drive distance to a target track, which is equal to 7 tracks×$\lambda$. The current velocity of the optical head is calculated by the formula shown below.

$$V_{n-2} = \lambda/2 \times 1/\Delta t_{n-2} \qquad (5)$$

In the present embodiment, an estimated velocity is determined while taking the delay into account because the velocity of formula (5) is an average velocity between the zero-crossing points. The estimated velocity $V_{n-2}'$ is given by $$V_{n-2}' = V_{n-2} + \alpha_{n-3} \cdot \Delta t_{n-2}/2 \qquad (6)$$

Since the constant acceleration velocity control is conducted in the present embodiment, it is assumed that the optical head moves from $t_{n-3}$ to $t_{n-2}$ at an acceleration of $\alpha_{n-3}$, and a delay thereof of $\alpha_{n-3} \cdot \Delta t_{n-2}/2$ is added to the average velocity $V_{n-2}$ obtained from the formula (5) to correct the velocity. At the point $t_{n-1}$, the reference velocity and the estimated velocity are similarly determined in the following manner.

$$V_{ref n-1} = [2 \cdot \alpha_{n-2}(S - \lambda/2 \cdot N_{n-1})]^{1/2} \qquad (7)$$

$$V_{n-1}' = V_{n-1} + \alpha_{n-2} \cdot \Delta t_{n-1}/2 \qquad (8)$$

Thus, the estimated velocity of the optical head is given by the following general formula:

$$V_n' = V_n + \alpha_{n-1} \cdot \Delta t_n/2 \qquad (9)$$

where $V_n$ is a detected average velocity, $\alpha_{n-1}$ is a control value applied at the previous time to the linear motor driver (the control value is a current representing the acceleration. Since the actual detection of the acceleration makes the system complex, it is substituted for the acceleration) and $\Delta t_n$ is a time period (velocity control interval) during which the control value is applied.

A specific velocity control operation in the seek mode of the optical head is now explained with reference to a flow chart of FIG. 5. In FIG. 5, a control operation for a multi-jump in one direction (toward the inner periphery) of the optical disk is illustrated. In FIG. 5, when a seek operation command is issued, the tracking error signal shown in FIG. 4 is supplied to the DSP 8 in a step S1. As described above, the tracking error signal is detected by the tracking error detector 3 based on the signal detected by the sensor in the optical system 2. The DSP 8 conducts the sampling of the tracking error signal at every predetermined interval and detects the zero-crossing point of the tracking error signal for each sampling (S2). The zero-crossing point may be detected by multiplying the current tracking error signal value and the signal value detected at the previous sampling, and if the product is zero or negative, determining that the tracking error signal is at the zero-crossing point or has passed the zero-crossing point, and regarding that point as the zero-crossing point. When the zero-crossing point is detected in step S3, the DSP 8 calculates the current velocity $V_n$ and the target velocity $V_{ref}$ by the formulas described above (S4). As described above, the current velocity $V_n$ is calculated from the formula (2) based on the track pitch $\lambda$ and the time $\Delta t_n$ between the zero-crossing points (which time is calculated by the DSP 8), and the target velocity $V_{ref}$ is calculated from the formula (1) based on the drive distance S to the target point, the deceleration $\alpha$ and the zero crossing count value N. Since the DSP 8 is released until the next sampling except when it detects the zero-crossing point, it may conduct other processing. The constants (e.g. track pitch) required for the above calculation are stored beforehand in the memory 9. The zero-crossing count value N is updated each time the zero-crossing point is detected and stored in the memory 9. After the calculation, the DSP 8 conducts the estimation of the velocity $V_n'$ described above (S5). As described above, the estimated velocity is calculated by the formula (9) based on the current velocity $V_n$, the previous applied acceleration $\alpha_{n-1}$ and the velocity control interval $\Delta t_n$. In this manner, the delay of the current velocity $V_n$ which has been a problem in the prior art can be effectively corrected. Then, the DSP 8 calculates the command value $A_{ct}$ to be supplied to the driver 10 of the linear motor 14, based on the previously calculated target velocity $V_{ref}$ and the estimated velocity $V_n'$ (S6). The command value $A_{ct}$ is calculated in the following manner.

$$A_{ct} = K(V_{ref} - V_n') \quad (10)$$

where K is a feedback gain of the velocity control system.

The calculated command value is sent from the DSP 8 to the D/A converter 11 through the I/O controller 7, converted to an analog signal thereby and is supplied to the driver 10 (S7). The driver 10 controls the linear motor 14 based on the command value so that the optical head is controlled to follow the target velocity.

FIG. 4 shows the target velocity and the real velocity of the optical head. It is seen from FIG. 4 that the real velocity substantially follows the target velocity. Then, whether the optical head has reached the target track or not is determined (S8), and if it has, the seek operation is terminated. If it has not reached the target track, the process returns to S1 and the above process is repeated. Thus, a command value for the driver 10 is calculated at every predetermined period based on the target velocity and the estimated velocity so that the optical head is always controlled to follow the target velocity. When the optical head reaches the target position (S8), the optical head velocity is zero as shown in FIG. 4 and the seek operation is terminated.

In the present embodiment, although the information recording/reproducing apparatus which uses the optical disk has been described, the present invention is not limited thereto. Rather, the present invention is also applicable to a recording/reproducing apparatus which uses a magnetic disk.

In accordance with the present invention, since the delay of the information recording/reproducing head is corrected, the head velocity is always correctively detected and the command value for the drive means can be calculated based on the exact velocity. Accordingly, exact control of the head seek operation is attained and stable seek control is always attained.

What is claimed is:

1. An information recording and/or reproducing apparatus for effecting at least one of recording information on and reproducing information from a recording medium having a plurality of tracks, using a recording/reproducing head, said apparatus comprising:

a head for recording information on and/or reproducing information from the recording medium;

moving means for moving said head to a desired track on the recording medium;

detecting means for detecting an average velocity of said head at a discrete timing;

generating means for generating a target moving velocity of said head;

control value generating means for generating control values for controlling said head at discrete timings, on the basis of the detected average velocity and the target moving velocity;

means for correcting the detected average velocity using a control value generated at a most recent prior timing, for producing an estimated velocity on the basis of an equation, $V'_n = V_n + \alpha_{n-1} \cdot \Delta t_n / 2$, where $V'_n$ is an estimated velocity, $V_n$ is the detected average velocity, $\alpha_{n-1}$ is a value corresponding to a control value applied at a prior timing and $\Delta t_n$ is a time period during which a previous control value was applied, and for sending the estimated velocity to said control value generating means, wherein said control value generating means generates an updated control value on the basis of the estimated velocity and the target moving velocity; and driving means for driving said head on the basis of a most recently generated control value.

2. An information recording and/or reproducing apparatus according to claim 1, further comprising tracking error signal detecting means for detecting a tracking error signal of said head, generated when said head is moved by said moving means, and wherein said moving velocity detecting means detects, for every detection period of zero-crossing points of a tracking error signal, the moving velocity from a distance corresponding to the detection period and a time period of the detection period.

3. An information recording and/or reproducing apparatus according to claim 2, wherein the distance corresponding to the detection period is ½ of a track pitch.

4. An information recording and/or reproducing apparatus according to claim 1, wherein said head is an optical head.

5. An information recording and/or reproducing method for effecting at least one of recording information on and reproducing information from a recording medium having a plurality of tracks, by using a recording/reproducing head, said method comprising the steps of:

moving the head in a direction across the tracks;

detecting an average velocity of the head at a discrete timing;

generating a target moving velocity of the head;

generating control values for controlling the head at discrete timings on the basis of the target moving velocity and the detected average velocity of the head;

correcting the detected average velocity using a control value generated at a most recent prior timing and producing an estimated velocity on the basis of an equation, $V'_n = V_n + \alpha_{n-1} \cdot \Delta t_n / 2$, where $V'_n$ is an estimated velocity, $V_n$ is the detected average velocity, $\alpha_{n-1}$ is a value corresponding to a control value applied at a prior timing and $\Delta t_n$ is a time period during which a previous control value was applied, wherein an updated control value is generated in said control value generating step on the basis of the estimated velocity and the target moving velocity; and driving the head on the basis of a most recently generated control value.

6. A method according to claim 5, further comprising detecting a tracking error signal generated upon moving the head across the tracks, and wherein the moving velocity is detected, for every detection period of zero-crossing points of the tracking error signal, from a distance corresponding to the detection period and a time period of the detection period.

7. An apparatus according to claim 6, wherein the distance corresponding to the detection period is one half of a track pitch.

* * * * *